United States Patent
Adrangi et al.

(10) Patent No.: US 9,520,918 B2
(45) Date of Patent: Dec. 13, 2016

(54) LOGIN VIA NEAR FIELD COMMUNICATION WITH AUTOMATICALLY GENERATED LOGIN INFORMATION

(75) Inventors: Farid Adrangi, Lake Oswego, OR (US); Sanjay Bakshi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/976,092

(22) PCT Filed: Dec. 16, 2011

(86) PCT No.: PCT/US2011/065493
§ 371 (c)(1),
(2), (4) Date: May 9, 2014

(87) PCT Pub. No.: WO2013/089777
PCT Pub. Date: Jun. 20, 2013

(65) Prior Publication Data
US 2014/0317708 A1 Oct. 23, 2014

(51) Int. Cl.
*H04L 29/00* (2006.01)
*H04B 5/00* (2006.01)
(Continued)

(52) U.S. Cl.
CPC ............ *H04B 5/0031* (2013.01); *G06F 21/35* (2013.01); *H04B 5/00* (2013.01); *H04L 63/0853* (2013.01);
(Continued)

(58) Field of Classification Search
CPC .................................................... H04M 11/00
(Continued)

(56) References Cited

U.S. PATENT DOCUMENTS 8,352,323 B2 * 1/2013 Fisher ........................... 705/16
8,813,182 B2 * 8/2014 Griffin ................... G06Q 20/10
705/39
(Continued)

FOREIGN PATENT DOCUMENTS

KR   10-2006-0025480 A   3/2006
KR   10-2007-0023129 A   2/2007
(Continued)

OTHER PUBLICATIONS

International Preliminary Report on Patentability and Written Opinion received for PCT Patent Application No. PCT/US2011/065493, mailed on Jun. 26, 2014, 8 pages.
(Continued)

*Primary Examiner* — Michael D Anderson
(74) *Attorney, Agent, or Firm* — Forefront IP Lawgroup, PLLC (57) ABSTRACT

Methods and devices for NFC tap login with automatically-generated login information are disclosed. A user can launch a browser application and log in a desired website without having to enter the user's username and password. The user can achieve this by tapping a Near Field Communication-enabled computing device with an NFC-enabled wireless device. The wireless device generates and stores the user's usernames and passwords corresponding to a number of websites, and provides the username and password for the desired website to the computing device via an NFC-based communication link. Through a browser application running on the computing device, the user can sign up an account at and log in the desired website.

20 Claims, 5 Drawing Sheets

(51) Int. Cl.
*H04W 12/06* (2009.01)
*G06F 21/35* (2013.01)
*H04W 8/20* (2009.01)
*H04W 92/18* (2009.01)
*H04L 29/06* (2006.01)
*H04W 4/00* (2009.01)

(52) U.S. Cl.
CPC ............ *H04W 12/06* (2013.01); *H04L 63/067* (2013.01); *H04L 63/0838* (2013.01); *H04W 4/008* (2013.01); *H04W 8/20* (2013.01); *H04W 92/18* (2013.01)

(58) Field of Classification Search
USPC .......................................................... 726/7
See application file for complete search history.

(56) References Cited

U.S. PATENT DOCUMENTS

2006/0206709 A1* 9/2006 Labrou ................. G06Q 20/18
                                                  713/167
2009/0144161 A1   6/2009 Fisher
2010/0011211 A1* 1/2010 Anemikos et al. ........... 713/168
2013/0165040 A1* 6/2013 McIntyre et al. ........... 455/41.1

FOREIGN PATENT DOCUMENTS

| WO | 2008/103991 A2 | 8/2008 |
| WO | 2010/095988 A1 | 8/2010 |
| WO | 2011/138558 A2 | 11/2011 |
| WO | 2013/089777 A1 | 6/2013 |

OTHER PUBLICATIONS

International Search Report and Written Opinion received for PCT Patent Application No. PCT/US2011/065493, mailed on Aug. 24, 2012, 11 pages.

Extended European Search Report received for European Patent Application No. 11877310.0, mailed on Jun. 8, 2015, 8 pages.

* cited by examiner

RECEIVE A SECOND REQUEST FROM THE WIRELESS DEVICE VIA THE NFC-BASED COMMUNICATION LINK, THE SECOND REQUEST INCLUDING A SECOND ID ASSOCIATED WITH A SECOND WEBSITE AND SECOND LOGIN INFORMATION FOR LOGGING IN THE SECOND WEBSITE
302

ACCESS THE SECOND WEBSITE USING THE SECOND ID AND THE SECOND LOGIN INFORMATION
304

LOGIN VIA NEAR FIELD COMMUNICATION WITH AUTOMATICALLY GENERATED LOGIN INFORMATION

BACKGROUND

With the prevalence of the Internet and network connectivity in households and businesses, many people obtain and/or provide information through a variety of websites and many online businesses transactions take place through business-related websites. For security reasons, many websites require a user to be identified and authenticated in order for the user to access information or conduct business by way of the user first logging in with a username and a password. When a user accesses a particular website that requires user login for the first time, the user needs to sign up by providing an acceptable username and password. In other words, for every new website signup, the user is expected to provide a fresh username and password (together referred to as "login information" hereinafter) and remember the login information for later login.

Typically, users tend to employ the same username and password that are easy to remember and recollect across most or all websites. However, a negative consequence is the exposure of users' website accounts to a "break once, run everywhere" (BORE) attack since, once a given user's username and password are stolen, most or all of such user's web accounts are suddenly vulnerable. Conversely, it is inconvenient for a user to come up with a number of different usernames and passwords and later remember them correctly or use the correct login information for the correct website.

Near Field Communication (NFC) is a standards-based connectivity technology that establishes wireless connection between two devices in close proximity of each other, typically in the order of a few centimeters. NFC allows users to transfer information by touching, or tapping, one device with another device. As with proximity card technology, NFC uses magnetic induction between two loop antennas located within two NFC-enabled devices that are within close proximity of each other, effectively forming an air-core transformer. The act of bringing one NFC-enabled device to close proximity of another NFC-enabled device with or without the two devices physically contacting each other, is referred to as an "NFC tap" or "one tap" operation hereinafter. With an NFC tap operation, a user can conveniently perform a variety of tasks, including mobile payment, secure login, wireless pairing, triggering peer-to-peer data exchange, file transfer, file sharing, mobile gaming, user identification, and so on. In the United States, for instance, many smartphones currently on the market already contain embedded NFC chips that can send encrypted data a short distance to a reader located next to a retail cash register.

NFC is an open platform technology standardized in ECMA-340 and ISO/IEC 18092. With these standards, ECMA is European Computer Manufacturers Association, ISO is international Organization for Standardization and IEC is for the International Electrotechnical Commission. Generally, these standards specify the modulation schemes, coding, transfer speeds and frame format of the RF interface of NFC devices, as well as initialization schemes and conditions required for data collision-control during initialization for both passive and active NFC modes. Furthermore, they also define the transport protocol, including protocol activation and data-exchange methods.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

DETAILED DESCRIPTION

Overview

Described herein are architectures, platforms and methods that enable NFC tap login with automatically generated login information. The techniques described herein leverage the NFC technology to provide NFC tap login experience where a user can use a registered smartphone to log in a web account without having to manually enter login credentials (such as the username and password) on a computing device through which the user is viewing and accessing the website. As the user does not need to remember the username and password, it is often recommended that a user select a unique and very strong password may for each website with which the user has an account and this advantageously enhances the login security from the user's perspective.

Example Framework

Figure 1:
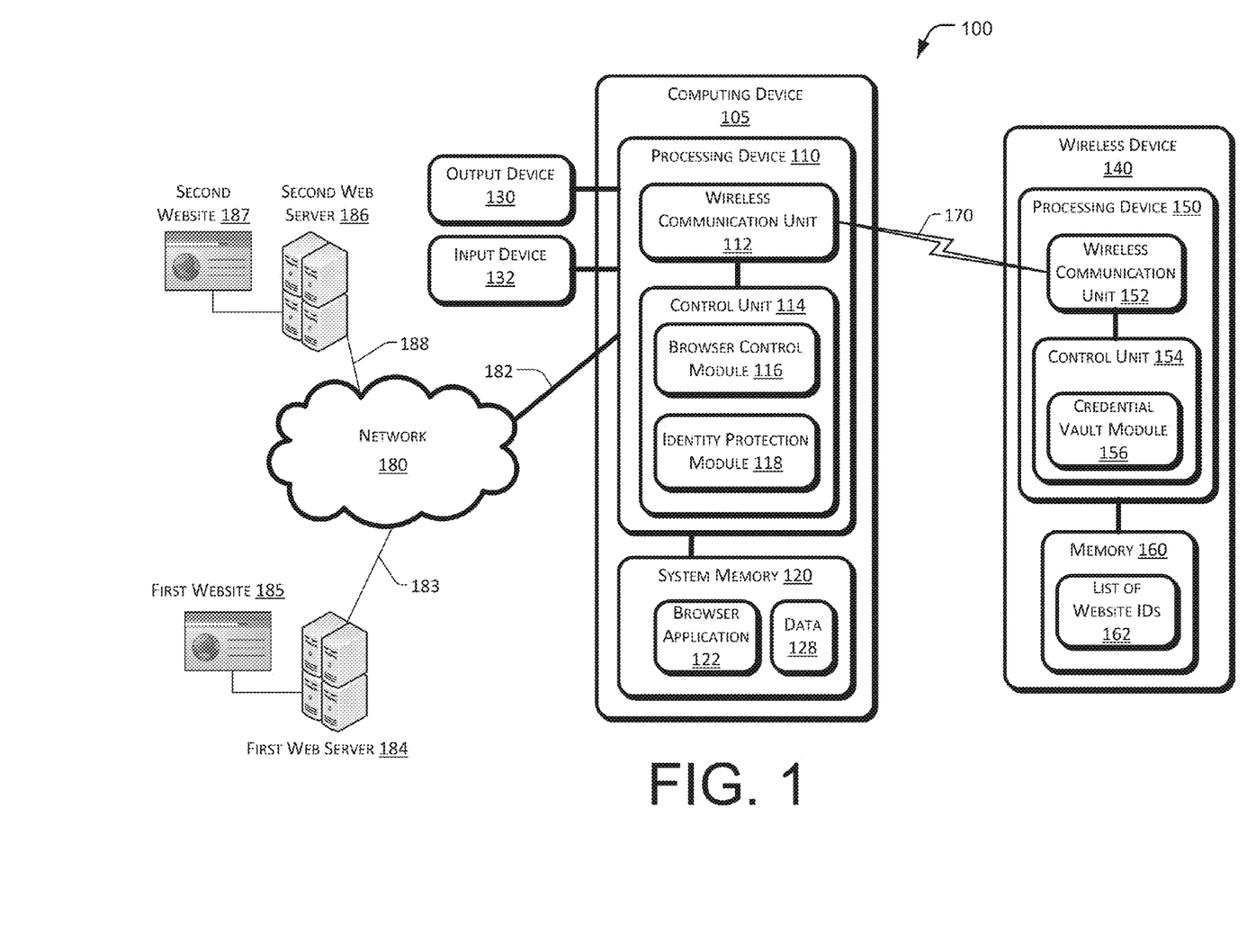
FIG. 1 is a block diagram illustrating an example framework implementing NFC tap login with automatically generated login information in accordance with the present disclosure.

FIG. 1 illustrates an example framework 100 that implements NFC tap login with automatically generated login information between a wireless device 140 and a computing device 105. In an implementation, both the computing device 105 and the wireless device 140 are equipped with necessary hardware and/or software to enable them to establish a communication link 170 based on the NFC technology. As an example for illustrative purpose, the computing device 105 may be an NFC-enabled notebook computer or laptop computer, and the wireless device 140 may be an NFC-enabled smartphone. When the wireless device 140 is in close proximity of the computing device 105, information exchange between the wireless device 140 and the computing device 105 occurs through the NFC-based communication link 170. This is the NFC tap.

The framework 100 may additionally include a network 180, which represents a combination of one or more wired and wireless networks and the Internet, and a number of web servers communicatively coupled to the network 180, such as first web server 184 and second web server 186, via network connections 183 and 188, respectively. The computing device 105 is communicatively coupled to the network 180 via network connection 182, and is able to receive information from and provide information to servers connected to the network 180, such as the web servers 184, 186. The computing device 105, or components of the computing device 105, may establish communication with the network 180 as well as one or more of the servers 184, 186. The first web server 184 hosts first website 185. The second web server 186 hosts the second website 187.

The computing device 105 may include a processing device 110 and system memory 120 coupled to the processing device 110. The processing device 110 may include a wireless communication unit 112 and a control unit 114 coupled to the wireless communication unit 112. The system memory 120 may have software applications and data stored therein, such as browser application 122 and data 128 as illustrated in FIG. 1. Those ordinarily skilled in the art would appreciate that, although a set number of applications and data file are shown in FIG. 1, in various implementations the number of applications and data files stored in the system memory 120 may differ. In some embodiments, the processing device 110 and the system memory 120 may be integral parts of an integrated circuit, or chip. Alternatively, the processing device 110 and the system memory 120 may be implemented in separate integrated circuits. In some embodiments, the control unit 114 and the wireless communication unit 112 may be integral parts of a chip. Alternatively, the control unit 114 and the wireless communication unit 112 may be implemented in separate chips, as in a chipset. In some embodiments, the processing device 110 may include hardware, firmware, software, or a combination thereof in some embodiments, some of the hardware components of the processing device 110 may include discrete electronic components on a printed circuit board.

The computing device 105 may also include an output device 130 and an input device 132. The output device 130 outputs information to a user visually, audibly, or both. The input device 132 receives input from the user. Although the output device 130 and the input device 132 are illustrated as being separate from each other in FIG. 1, in some embodiments the output device 130 and the input device 132 may be integral parts of an input/output device. Although the output device 130 and the input device 132 are illustrated as being detachably coupled to the computing device 105 in FIG. 1, in some embodiments the output device 130 and the input device 132 may be integral parts of the computing device 105.

The wireless communication unit 112 can establish wireless communication with one or more wireless devices, such as the wireless device 140, to receive information from and transmit information to the wireless device 140 via the NFC-based communication link 170.

The control unit 114 can examine information received by the wireless communication unit 112 from one or more wireless devices, such as information transmitted from the wireless device 140 for example. The control unit 114 can verify whether the wireless device from which the examined information is received is an authorized device. For example, the information received from the wireless device 140 may contain identification of the wireless device 140, e.g., a plain language description, a name given by its user, a serial number, a Media Access Control (MAC) number or the like. The control unit 114 may compare such identification with a table of identifications of devices authorized by a user to establish communication with the computing device 105. When there is a match between the identification of the wireless device 140 and the identification of an authorized device, the control unit 114 verifies the wireless device 140 as an authorized device, and further communication and operations may ensue. In an event that the wireless device 140 is not verified as an authorized device, the control unit 114 may prevent any action by the computing device 105 or any part thereof from being triggered by the wireless device 140.

The control unit 114 can detect a user's intent to log in a first website, such as the first website 185. For example, the user may surf the web through the browser application 122 and using the output device 130 and the input device 132. The first website 185 may require the user to log in, and there may be a button on the login webpage for the user to click on. The control unit 114 detects the user's intent to log in the first website 185 when the user clicks on the login button. There may be a new account sign-up button on the login webpage for those who do not yet have an account with the first website 185. The control unit 114 detects the user's intent to sign up for a new account when the user clicks on the new account sign-up button. Subsequently, the control unit 114 generates a first request that contains a first identification associated with the first website 185, e.g., the URL of the first website 185. The control unit 114 then directs the wireless communication unit 112 to transmit the first request to the wireless device 140 via the NFC-based communication link 170 during the NFC tap operation carried out by the user. In response, the wireless device 140 transmits first login information that is specific to the first website 185 to the wireless communication unit 112 via the NFC-based communication link 170. The control unit 114 receives the first login information from the wireless communication unit 112 and provides the first login information to the first website 185 to log in the first website 185 for the user. For example, the control unit 114 can provide the first login information to the browser application 122 to fill in the user's username and password for the first website 185 into pertinent entry fields on the login webpage of the first website 185 to log in the first website 185.

As an additional layer of security, the control unit 114 may provide authentication information to the wireless device 140 through the wireless communication unit 112 before receiving the first login information specific to the first website 185 from the wireless device 140. In other words, the wireless device 140 may need to authenticate the first request before releasing any sensitive information such as the user's login information.

When the user uses the wireless device 140 to select a second website to log in, e.g., the second website 187, the wireless device 140 transmits a second request to the wireless communication unit 112, which provides the second request to the control unit 114. The second request contains a second identification of the second website, e.g., the URL of the second website 187, and second login information specific to the second website, e.g., the user's username and password for logging in the second website 187. Upon receiving the second request from the wireless device 140, the control unit 114 launches the browser application 122 (if not already launched and running), and provides the second identification, e.g., the URL of the second website 187, and the second login information, e.g., the user's username and password for logging in the second website 187, to the browser application 122 to log in the second website 187.

In some embodiments, the processing device 110 may also include a browser control module 116. The browser control module 116 may be implemented as software, middleware, firmware, hardware or a combination thereof. For example, the browser control module 116 may be a part of the control unit 114. The browser control module 116 can launch the browser application 122, which can be used by the user to access a login page associated with the first website 185. The browser control module 116 can obtain the first identification associated with the login page of the first website 185, e.g., the URL, and provide the first identification to the control unit 114 for the control unit 114 to generate the first request. Once the control unit 114 receives the first login information from the wireless device 140, the browser control module 116 receives the first login information from the control unit 114 and provides the first login information to the browser application 122 to log in the first website 185. Upon receiving the second request from the wireless device 140, the control unit 114 provides the second request to the browser control module 116. The browser control module 116 in turn launches the browser application 122 (if not already launched and running), and provides the second identification, e.g., the URL of the second website 187, and the second login information, e.g., the user's username and password for logging in the second website 187, to the browser application 122 to log in the second website 187.

In some embodiments, the browser control module 116 may include a browser plug-in element that, when the browser application 122 is launched and running, interacts with the browser application 122 to obtain information from and provide information to websites through the browser application 122. For example, the browser plug-in may capture the URL of the login/sign-up webpage of the first website 185 or the second website 187 as well as fill in the username and password into pertinent entry fields on the login/sign-up webpage to log in the user or sign up a new account for the user.

In some embodiments, the processing device 110 may also include an identity protection module 118. The identity protection module 118 may be implemented as software, middleware, firmware, hardware or a combination thereof. For example, the identity protection module 118 may be a part of the control unit 114. The identity protection module 118 can generate a one-time password in response to receiving a request from the browser control module 116. The identity protection module 118 then provides the one-time password to the browser control module 116. The browser control module 116 in turn provides the one-time password, in addition to the first login information, to the browser application 122 to log in the first website 185.

The wireless device 140 may include a processing device 150 and memory 160 coupled to the processing device 150. The processing device 150 may include a wireless communication unit 152 and a control unit 154 coupled to the wireless communication unit 152. The memory 160 may have software applications and data stored therein, including a list of website identifications 162 as illustrated in FIG. 1. In some embodiments, the processing device 150 and the memory 160 may be integral parts of an integrated circuit, or chip. Alternatively, the processing device 150 and the memory 160 may be implemented in separate integrated circuits. In some embodiments, the control unit 154 and the wireless communication unit 152 may be integral parts of a chip. Alternatively, the control unit 154 and the wireless communication unit 152 may be implemented in separate chips, as in a chipset. In some embodiments, the processing device 150 may include hardware, firmware, software, or a combination thereof. In some embodiments, some of the hardware components of the processing device 150 may include discrete electronic components on a printed circuit board.

The wireless communication unit 152 can establish wireless communication with the computing device 105, or more specifically the wireless communication unit 112, to receive information from the computing device 105 and transmit information to the computing device 105 via the NFC-based communication link 170.

The memory 160 stores the list of website identifications 162. Each website identification in the list of website identifications 162 includes corresponding login information for a respective website. For example, the list of website identifications 162 may include a list of URLs each for a respective website for which the user has previously created an account. Additionally, the list of website identifications 162 may include login information, e.g., username and password, for each of the websites corresponding to the website identifications in the list.

The control unit 154 can authenticate the computing device 105 to ensure the computing device 105 is authorized to receive any information, including login information that the wireless communication unit 152 transmits via the NFC-based communication link 170. In an event that the computing device 105 is authenticated, the control unit 154 can direct the wireless communication unit 152 to transmit the first login information or the generated login information corresponding to the first identification associated with the first website 185 to the computing device 105.

The control unit 154 may include a credential vault module 156. The credential vault module 156 may be implemented as software, middleware, firmware, hardware or a combination thereof. The credential vault module 156 can receive the first request, which contains the first identification associated with the first website 185, from the computing device 105. For example, by way of the NFC tap operation, the wireless communication unit 112 of the computing device 105 transmits the first request to the wireless communication unit 152 of the wireless device 140, and the control unit 154, or more specifically the credential vault module 156, receives the first request from the wireless communication unit 152.

Upon receiving the first request, the credential vault module 156 can determine whether the first identification associated with the first website 185 matches any website identification in the list of website identifications 162. For example, the credential vault module 156 can determine whether the URL of the first website 185 matches any URL in the list of website identifications 162. If there is a match, the credential vault module 156 may determine that the first request is for the user to log in to the first website 185 for which a corresponding username and a corresponding password had been created and are stored in the memory 160, e.g., as part of the list of website identifications 162. If there is no match, the credential vault module 156 may determine that the first request is for the user to sign up for a new account at the first website 185. In an event that the first identification matches a website identification in the list of website identifications 162, the credential vault module 156 can direct the wireless communication unit 152 to transmit first login information corresponding to the first identification associated with the first website 185 to the computing device 105. In an event that the first identification does not match any website identification in the list of website identifications 162, the credential vault module 156 can automatically generate login information for the first website 185, store the generated login information in the list of website identifications 162 in the memory 160, and direct the wireless communication unit 152 to transmit the generated login information to the computing device 105.

The credential vault module 156 can receive a user input indicative of selection of a second website 187 from a plurality of websites. For example, the user may select from among the websites corresponding to those website identifications in the list of website identifications 162 a website, e.g., the second website 187, to log in. Upon receiving the user input, the credential vault module 156 can generate the second request, which includes a second identification associated with the second website 187, e.g., the URL of the second website 187, and second login information for logging in the second website, e.g., the user's username and password specific to the second website 187. The credential vault module 156 can then direct the wireless communication unit 152 to transmit the second request to the computing device 105 via the NFC-based communication link 170. As described above, the computing device 105 can use the second login information to log in the second website 187 for the user to access the second website 187 with the output device 130 and the input device 132.

The credential vault module 156 can determine whether the second identification associated with the second website 187 matches any website identification in the list of website identifications 162. In an event that the second identification does not match any website identification in the list of website identifications 162, the credential vault module 156 can generate the second login information for the second website 187 and store the generated second login information in the list of website identifications 162 in the memory 160. For example, the user may select, on the wireless device 140, a website for which the user has not yet created an account. The credential vault module 156 can determine that a new username and password need to be created, as there is no match of the URL of the selected website in the list of website identifications 162. In such case, the credential vault module 156 can create username and password for the selected website and create the second request that includes the URL of the selected website and the created username and password.

Example Methods

Figure 2:
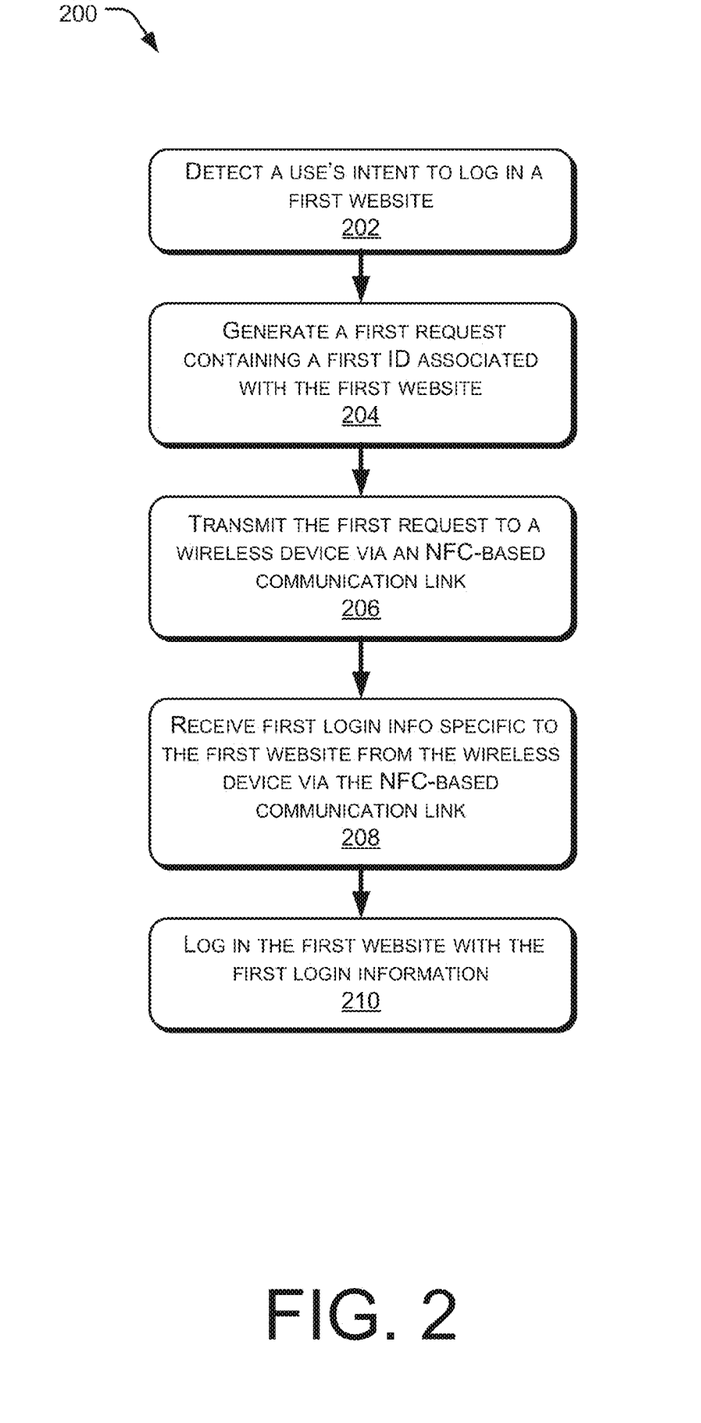
FIG. 2 is a flowchart illustrating an example method for NFC tap login with automatically generated login information in accordance with the present disclosure.

FIG. 2 illustrates an example method 200 for NFC tap login with automatically generated login information from the perspective of the computing device 105.

At block 202, a user's intent to log in a first website is detected. For example, the control unit 114 of the computing device 105, e.g., via the input device 132 and/or the browser application 122, can detect the user's intent to log in the first website 185 when the user clicks on a login button or a new account sign-up button on a login/sign-up webpage of the first website 185.

At block 204, a first request containing a first identification associated with the first website is generated. For example, upon detecting the user's intent to log in the first website 185, the control unit 114 can generate the first request that contains the URL of the first website 185.

At block 206, the first request is transmitted to a wireless device via an NFC-based communication link. For example, the control unit 114 can transmit, via the wireless communication unit 112, the first request to the wireless device 140 via the NFC-based communication link 170.

At block 208, first login information specific to the first website is received from the wireless device via the NFC-based communication link. For example, the control unit 114 can receive the user's username and password specific to the first website 185 from the wireless device 140 via the NFC-based communication link 170.

At block 210, the first website is logged in with the first login information. For example, the control unit 114, or more specifically the browser control module 116, can log in the first website 185 with the user's username and password received from the wireless device 140.

In some embodiments, the user's intent to log in the first website may be an intent to sign up for a new account at the first website. For example, the user's intent may be a click by the user on a new account sign-up button on the sign-up webpage of the first website 185. In such case, the control unit 114 generates the first request as a signup request that includes the URL of the first website 185. The credential vault module 156, after determining there is no match to the URL of the first website 185 in the list of website identifications 162, can generate new username and password for the first website 185. With the new username and password, the control unit 114 can sign up the user at the first website 185.

In some embodiments, the user's intent to log in the first website may be intent to log in the first website 185 for which the user has signed up previously. For example, the user's intent may be a click by the user on a login button on the login webpage of the first website 185. In such case, the control unit 114 generates the first request as a login request that includes the URL of the first website 185. The credential vault module 156, after determining there is a match to the URL of the first website 185 in the list of website identifications 162, can provide the previously generated username and password for the first website 185.

In some embodiments, the first login information specific to the first website is received from the wireless device after the first request has been authenticated by the wireless device. For example, the wireless device 140 may need to authenticate the first request from the computing device 105 before releasing any sensitive information such as the first login information. This ensures the first request is coming from an authorized device.

In some embodiments, the method 200 may further provide notification to the user via an output device to prompt the user to tap the wireless device on a computing device which is used by the user to access the first website such that the first request is transmitted from the computing device to the wireless device when the wireless device taps the computing device. For example, the control unit 114 may display a message on the output device 130 to prompt the user to carry out a one-tap operation using the wireless device 140. As the user carries out the one tap operation, the first request is transmitted from the computing device 105 to the wireless device 140.

In some embodiments, the method 200 may further generate a one-time password and provide the one-time password along with the first login information when logging in the first website. For example, the identify protection module 118 can generate a one-time password which is provided with the first login information to the browser application 122 when logging in the first website.

In some embodiments, the method 200 may further receive a second request from the wireless device via the NFC-based communication link where the second request includes a second identification associated with a second website and second login information for logging in the second website. The method 200 may additionally access the second website using the second identification and the second login information and receive output information related to the second website. For example, the control unit 114 can receive the second request from the wireless device 140 via the NFC-based communication link 170, and the second request includes the URL of the second website 187 and the user's username and password for logging in the second website 187. The control unit 114 in turn can log in and access the second website 187, and output information on the second website 187 to the user via the output device 130.

Figure 3:
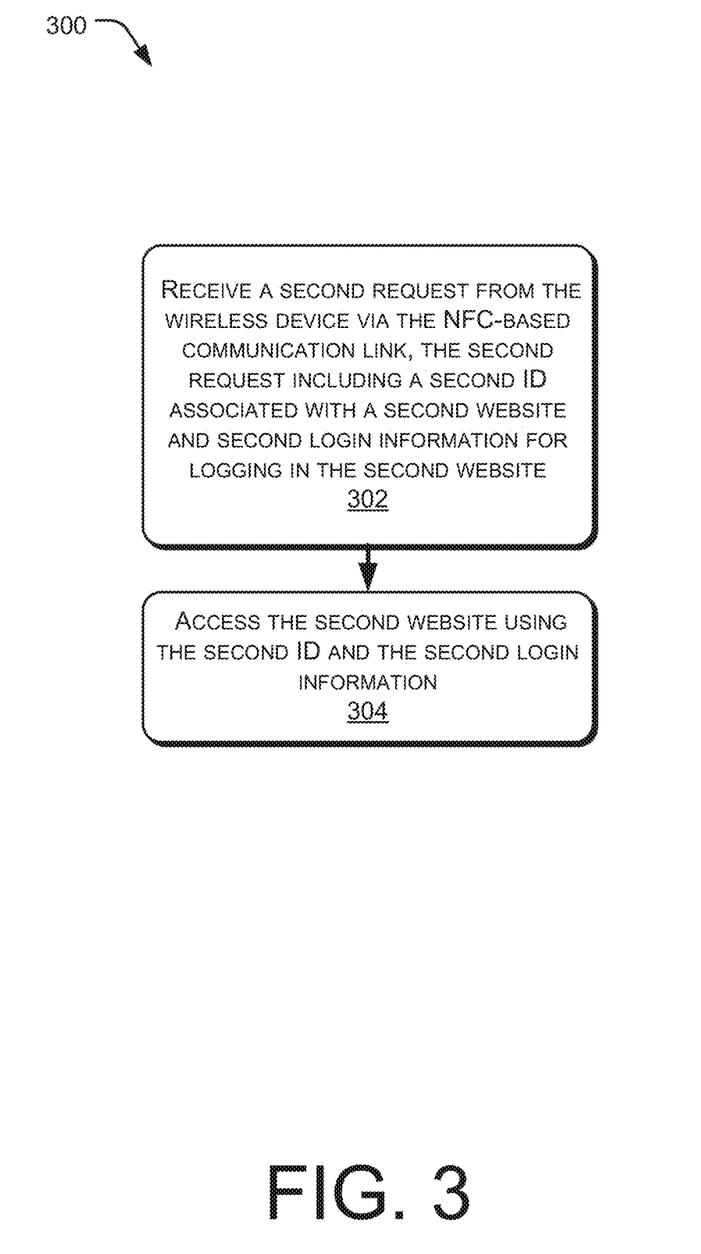
FIG. 3 is a flowchart illustrating another example method for NFC tap login with automatically generated login information in accordance with the present disclosure.

FIG. 3 illustrates another example method 300 for NFC tap login with automatically generated login information from the perspective of the wireless device 140.

At block 302, a request is received from a wireless device via an NFC-based communication link where the request includes an identification associated with a website and login information for logging in the website. For example, the control unit 114 can receive the second request from the wireless device 140 via the NFC-based communication link 170, and the second request includes the URL of the second website 187 and the user's username and password for logging in the second website 187.

At block 304, the website is accessed using the identification and the login information. For example, upon receiving the second request, the control unit 114 can log in and access the second website 187, and output information on the second website 187 to the user via the output device 130. Further, upon receiving output information related to the second website 187, the processing device 110 can output the output information to the user via the output device 130.

In some embodiments, the method 300 may further generate a one-time password and provide the one-time password along with the login information when accessing the website. For example, the identify protection module 118 can generate a one-time password which is provided with the first login information to the browser application 122.

Figure 4:
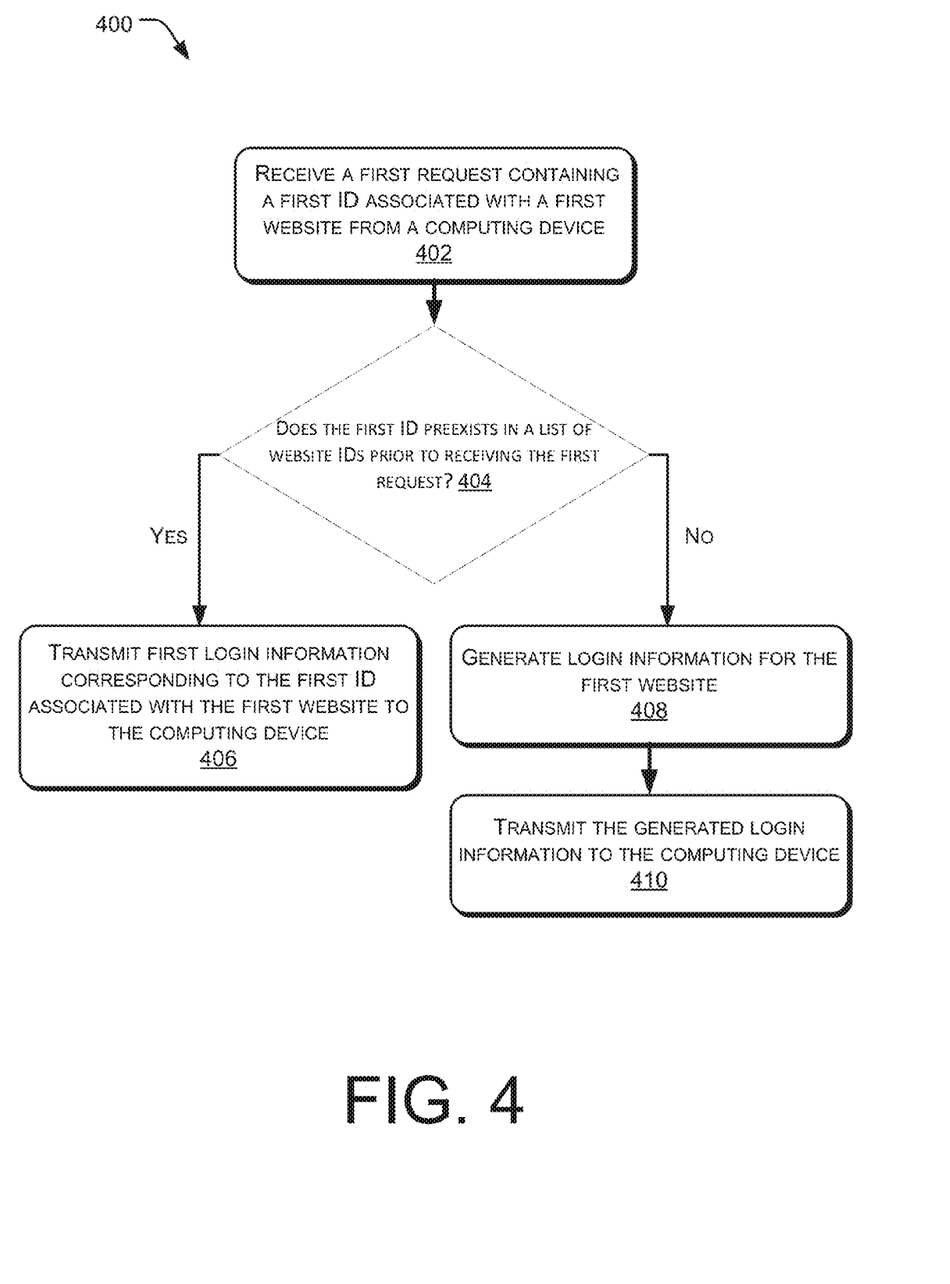
FIG. 4 is a flowchart illustrating still another example method for NFC tap login with automatically generated login information in accordance with the present disclosure.

FIG. 4 illustrates an example method 400 for NFC tap login with automatically generated login information from the perspective of the wireless device 140.

At block 402, a first request containing a first identification associated with a first website is received from a computing device. For example, the wireless device 140 can receive the first request from the computing device 105, and the first request contains the URL of the first website 185.

At block 404, it is determined whether the first identification preexists in a list of website identifications prior to receiving the first request. Each website identification in the list of website identifications has corresponding login information for a respective website. For example, the control unit 154, or more specifically the credential vault module 156, can determine whether there is a match between the URL of the first website 185 and any URL the list of website identifications 162.

At block 406, in an event that the first identification preexists in the list of website identifications prior to receiving the first request, first login information corresponding to the first identification associated with the first website is transmitted to the computing device. For example, if there is a match between the URL of the first website 185 and one of the URLs in the list of website identifications 162, the credential vault module 156 can provide the user's preexisting username and password previously generated for the first website 185 to the computing device 105 via the wireless communication unit 152.

At block 408, in an event that the first identification does not preexist in the list of website identifications prior to receiving the first request, login information for the first website is generated. At block 410, the generated login information is transmitted to the computing device. For example, if there is no match between the URL of the first website 185 and any URL in the list of website identifications 162, the credential vault module 156 can generate new username and password for the user for the first website 185. The wireless communication unit 152 can then transmit the newly generated username and password to the computing device 105.

In some embodiments, the method 400 may further authenticate the computing device such that the first login information corresponding to the first identification associated with the first website, or the newly generated login information, is transmitted to the computing device after the computing device has been authenticated. For example, the wireless device 140 can authenticate the computing device 105 before transmitting any sensitive information including the login information for the first website 185, whether preexisting or newly generated, to the computing device 105.

In some embodiments, the method 400 may further receive a user input indicative of selection of a second website from a plurality of websites. The method 400 may then generate a second request including a second identification associated with the second website and second login information for logging in the second website. The method 400 may further transmit the second request to the computing device via the NFC-based communication link. For example, the wireless device 140 can receive a user input indicating the user's selection of the second website 187 to log in. Accordingly, the wireless device 140, or more specifically the control unit 154 or the credential vault module 156, can generate the second request that includes the URL of the second website 187 and the user's username and password for the second website 187. The wireless device 140 can then transmit the second request to the computing device 105 via the NFC-based communication link 170 during an NFC tap operation carried out by the user.

In some embodiments, the method 400 may further determine whether the second identification associated with the second website matches any website identification in the list of website identifications. In an event that the second identification does not match any website identification in the list of website identifications, the method 400 may generate the second login information for the second website and store the generated second login information in the list of website identifications. For example, upon receiving the user input indicating the user's selection of the second website 187 to log in, the wireless device 140, or more specifically the credential vault module 156, can determine whether there is a match between the URL of the second website 187 and any URLs in the website identifications 162. If there is no match, the credential vault module 156 can generate new username and password for the user to sign up and log in the second website 187. In such case, the new username and password can be saved in the list of website identifications 162 along with the URL of the second website 187.

Example Computing Device

Figure 5:
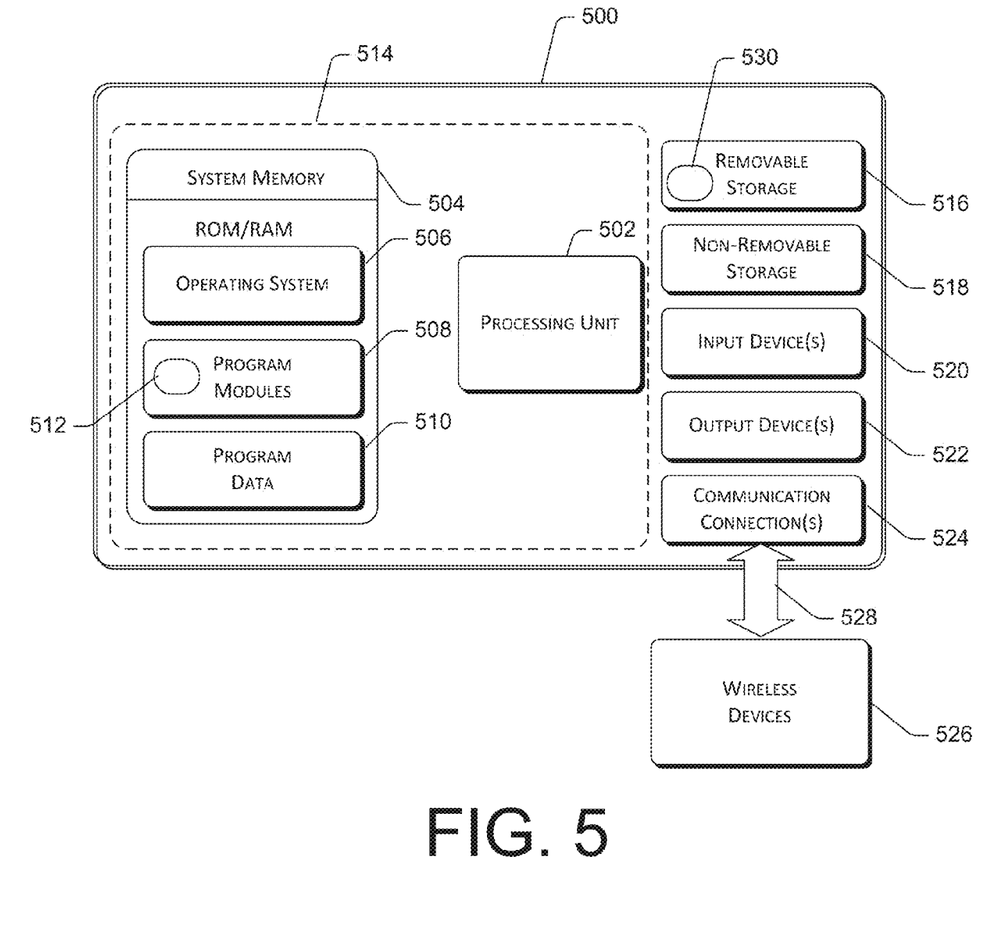
FIG. 5 is a block diagram illustrating an example-computing device that implements a NFC tap login with automatically generated login information in accordance with the present disclosure.

FIG. 5 illustrates an example computing device 500 that implements the scheme of NFC tap login with automatically generated login information. However, it will be readily appreciated that the techniques disclosed herein may be implemented in other computing devices, systems, and environments. The computing device 500 shown in FIG. 5 is one example of a computing device and is not intended to suggest any limitation as to the scope of use or functionality of the computer and network architectures.

In at least one implementation, computing device 500 typically includes at least one processing unit 502 and system memory 504. Depending on the exact configuration and type of computing device, system memory 504 may be volatile (such as RAM), non-volatile (such as ROM, flash memory, etc.) or some combination thereof. System memory 504 may include an operating system 506, one or more program modules 508, and may include program data 510. A basic implementation of the computing device 500 is demarcated by a dashed line 514.

The program module 508 may include a module 512 configured to implement the one-tap connection and synchronization scheme as described above. For example, the module 512 may carry out one or more of the method 200, method 300 and method 400, and variations thereof, e.g., the computing device 500 acting as described above with respect to the computing device 105 or the wireless device 140.

Computing device 500 may have additional features or functionality. For example, computing device 500 may also include additional data storage devices such as removable storage 516 and non-removable storage 518. In certain implementations, the removable storage 516 and non-removable storage 518 are an example of computer accessible media for storing instructions that are executable by the processing unit 502 to perform the various functions described above. Generally, any of the functions described with reference to the figures can be implemented using software, hardware (e.g., fixed logic circuitry) or a combination of these implementations. Program code may be stored in one or more computer accessible media or other computer-readable storage devices. Thus, the processes and components described herein may be implemented by a computer program product. As mentioned above, computer accessible media includes volatile and non-volatile, removable and non-removable media implemented in any method or technology for storage of information, such as computer readable instructions, data structures, program modules, or other data. The terms "computer accessible medium" and "computer accessible media" refer to non-transitory storage devices and include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium that can be used to store information for access by a computing device, e.g., computing device 500 and computing device 105. Any of such computer accessible media may be part of the computing device 500.

In one implementation, the removable storage 516, which is a computer accessible medium, has a set of instructions 530 stored thereon. When executed by the processing unit 502, the set of instructions 530 cause the processing unit 502 to execute operations, tasks, functions and/or methods as described above, including method 200, method 300, method 400 and any variations thereof.

Computing device 500 may also include one or more input devices 520 such as keyboard, mouse, pen, voice input device, touch input device, etc. Computing device 500 may additionally include one or more output devices 522 such as a display, speakers, printer, etc.

Computing device 500 may also include one or more communication connections 524 that allow the computing device 500 to wirelessly communicate with one or more other wireless devices, over wireless connection 528 based on NFC, Wi-Fi, Bluetooth, RF or a combination thereof.

It is appreciated that the illustrated computing device 500 is one example of a suitable device and is not intended to suggest any limitation as to the scope of use or functionality of the various embodiments described.

Other Implementations Details and Notes

In another implementation, a user enters a website URL via a keyboard of a device (like wireless device 140). The control until 154 checks the URL via the credential vault module 156 to see if the URL exists in its web-site list or not. If it does not exist, then a fresh username and password is generated.

Examples of NFC-enabled devices that may be used with implementations described herein and other implementations include (but are not limited to) laptop computers, notebook computers, tablet computers, netbook computers, mobile computers, feature phones, smart phones, palmtop computers, desktop computers, servers, and other such computing devices.

In Detailed Description, numerous specific details are set forth in order to provide a thorough understanding of the present disclosure. However, those of ordinary skill in the art would appreciate that the present disclosure may be practiced without these specific details. In other instances, well-known methods, procedures, components and circuits have not been described in detail so as not to obscure the present disclosure.

For each method described in the present disclosure, the order in which the method blocks is described is not intended to be construed as a limitation, and any number of the described method blocks may be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the present disclosure.

Realizations in accordance with the present disclosure have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the present disclosure as defined in the claims that follow.

What is claimed is:

1. A method comprising:
   detecting a user's intent to log in a first website;
   generating a first request containing a first identification that is associated with the first website, wherein the first identification is a uniform resource locator (URL) of the first website;
   transmitting the first request to a wireless device via a Near Field Communication (NFC)-based communication link;
   receiving first login information that is specific to the first website from the wireless device via the NFC-based communication link, the first login information includes an associated username and password that correspond to the first website;
   logging in the first website with the first login information;

receiving a second request from the wireless device via the NFC-based communication link, the second request including a second identification associated with a second website and second login information for logging in the second website;

accessing the second website using the second identification and the second login information; and receiving output information related to the second website.

2. A method as recited in claim 1, wherein the detecting comprises detecting the user's intent to sign up for a new account at the first website, wherein the first request comprises a signup request that triggers a credential vault application to generate a username and a password specific to the first website, and wherein logging in the first website as the user with the first login information comprises logging in the first website with the username and password to sign up the user at the first website.

3. A method as recited in claim 1, wherein the detecting comprises detecting the user's intent to log in the first website that the user has signed up previously, wherein the first request comprises a login request that triggers a credential vault application to provide a previously-generated username and a previously-generated password specific to the first website, and wherein logging in the first website as the user with the first login information comprises logging in the first website as the user with the previously-generated username and the previously-generated password.

4. A method as recited in claim 1, wherein receiving the first login information specific to the first website from the wireless device comprises receiving the first login information specific to the first website from the wireless device after the first request has been authenticated by the wireless device.

5. A method as recited in claim 1, further comprising: providing notification to the user via an output device to prompt the user to tap the wireless device on a computing device which is used by the user to access the first website such that the first request is transmitted from the computing device to the wireless device when the wireless device taps the computing device.

6. A method as recited in claim 1, further comprising: generating a one-time password; and
providing the one-time password along with the first login information when logging in the first website.

7. A method comprising:
receiving a first request containing a first identification associated with a first website from a computing device, wherein the first identification is a uniform resource locator (URL) of the first website;
determining whether or not the first identification preexists in a list of website identifications prior to receiving the first request, each website identification in the list of website identifications having corresponding login information for a respective website;
in an event that the first identification preexists in the list of website identifications prior to receiving the first request, transmitting first login information corresponding to the first identification associated with the first website to the computing device; and
in an event that the first identification does not preexist in the list of website identifications prior to receiving the first request:
generating login information for the first website, the login information includes an associated username and password that correspond to the website; and transmitting the generated login information to the computing device.

8. A method as recited in claim 7, wherein receiving the first request from the computing device comprises receiving the first request from the computing device via a Near Field Communication (NFC)-based communication link, wherein transmitting first login information to the computing device comprises transmitting the first login information to the computing device via the NFC-based communication link, and wherein transmitting the generated login information to the computing device comprises transmitting the generated login information to the computing device via the NFC-based communication link.

9. A method as recited in claim 7, further comprising:
authenticating the computing device, wherein:
transmitting first login information corresponding to the first identification associated with the first website to the computing device comprises transmitting the first login information corresponding to the first identification associated with the first website to the computing device after the computing device has been authenticated, and
transmitting the generated login information to the computing device comprises transmitting the generated login information to the computing device after the computing device has been authenticated.

10. A method as recited in claim 7, further comprising:
receiving a user input indicative of selection of a second website from a plurality of websites;
generating a second request including a second identification associated with the second website and second login information for logging in the second website; and
transmitting the second request to the computing device via the NFC-based communication link.

11. A method as recited in claim 10, further comprising:
determining whether the second identification associated with the second website matches any website identification in the list of website identifications;
in an event that the second identification does not match any website identification in the list of website identifications:
generating the second login information for the second website; and
storing the generated second login information in the list of website identifications.

12. A processing device comprising:
a wireless communication unit configured to communicate with a wireless device via a Near Field Communication (NFC)-based communication link; and
a control unit coupled to the wireless communication unit, the control unit configured to:
detect a user's intent to log in a first website;
generate a first request containing a first identification associated with the first website, wherein the first identification is a uniform resource locator (URL) of the first website;
direct the wireless communication unit to transmit the first request to the wireless device via the NFC-based communication link;
receive first login information specific to the first website from the wireless device through the wireless communication unit, the first login information includes an associated username and password that correspond to the first website; and
provide the first login information to the first website to log in the first website for the user.

13. A processing device as recited in claim 12, wherein the control unit is further configured to provide authentication information to the wireless device through the wireless communication unit before receiving the first login information specific to the first website from the wireless device.

14. A processing device as recited in claim 12, further comprising:
a browser control module coupled to provide information to and receive information from the control unit, the browser control module configured to:
launch a browser application to access a login page associated with a first website;
provide the first identification associated with the login page of the first website to the control unit;
receive the first login information from the control unit; and
provide the first login information to the browser application to log in the first website.

15. A processing device as recited in claim 12, wherein the control unit is further configured to receive a second request from the wireless device through the wireless communication unit and provide the second request to the browser control module, the second request including a second identification associated with a second website and second login information for logging in the second website, wherein the browser control module is further configured to:
receive from the control unit the second identification associated with the second website and the second login information;
launch the browser application; and
provide the second identification and the second login information to the browser application to log in the second website.

16. A processing device as recited in claim 12, further comprising:
an identify protection module coupled to receive a request from the browser control module configured to:
generate a one-time password in response to receiving a request from the browser control module; and
provide the one-time password to the browser control module, wherein the browser control module provides the one-time password, in addition to the first login information, to the browser application to log in the first website.

17. A processing device comprising:
a wireless communication unit configured to communicate with a computing device via a Near Field Communication (NFC)-based communication link;
memory adapted to store a list of website identifications, each website identification in the list of website identifications having corresponding login information for a respective website; and
a control unit coupled to the wireless communication unit and the memory, the control unit including a credential vault module configured to:
receive a first request containing a first identification associated with a first website from the computing device, wherein the first identification is a uniform resource locator (URL) of the first website;
determine whether the first identification associated with the first website matches any website identification in the list of website identifications;
in an event that the first identification matches a website identification in the list of website identifications, direct the wireless communication unit to transmit first login information corresponding to the first identification associated with the first website to the computing device; and
in an event that the first identification does not match any website identification in the list of website identifications:
generate login information for the first website, the login information includes an associated username and password that correspond to the first website;
store the generated login information in the list of website identifications in the memory; and
direct the wireless communication unit to transmit the generated login information to the computing device.

18. A processing device as recited in claim 17, wherein the control unit is configured to:
authenticate the computing device; and
direct the wireless communication unit to transmit the first login information or the generated login information corresponding to the first identification associated with the first website to the computing device.

19. A processing device as recited in claim 17, wherein the credential vault module is further configured to:
receive a user input indicative of selection of a second website from a plurality of websites;
generate a second request including a second identification associated with the second website and second login information for logging in the second website; and
direct the wireless communication unit to transmit the second request to the computing device via the NFC-based communication link.

20. A processing device as recited in claim 19, wherein the credential vault module is further configured to:
determine whether the second identification associated with the second website matches any website identification in the list of website identifications;
in an event that the second identification does not match any website identification in the list of website identifications:
generate the second login information for the second website; and
store the generated second login information in the list of website identifications in the memory.

* * * * *